(12) United States Patent
Coelho

(10) Patent No.: US 9,407,384 B2
(45) Date of Patent: Aug. 2, 2016

(54) SYSTEM FOR THE INTEGRATION OF SIGNAL-TRANSMISSION/-RECEPTION TECHNOLOGIES FOR HIGHWAY USE

(71) Applicant: RADIOESTRADA COMUNICAçÕES LTDA., Santana de Parnaíba-SP (BR)

(72) Inventor: Carlos Antônio Coelho, São Paulo (BR)

(73) Assignee: RADIOESTRADA COMUNICAçÕES LTDA., Santana de Parnaíba (BR)

(*) Notice: Subject to any disclaimer, the term of this patent is extended or adjusted under 35 U.S.C. 154(b) by 125 days.

(21) Appl. No.: 14/387,666

(22) PCT Filed: Mar. 25, 2013

(86) PCT No.: PCT/BR2013/000092
§ 371 (c)(1),
(2) Date: Nov. 13, 2014

(87) PCT Pub. No.: WO2013/142932
PCT Pub. Date: Oct. 3, 2013

(65) Prior Publication Data
US 2015/0063571 A1    Mar. 5, 2015

(30) Foreign Application Priority Data
Mar. 26, 2012    (BR) .............................. 102012006742

(51) Int. Cl.
| | |
|---|---|
| *H04K 3/00* | (2006.01) |
| *H04H 20/88* | (2008.01) |
| *G01S 19/13* | (2010.01) |
| *H04H 20/57* | (2008.01) |
| *H04H 20/62* | (2008.01) |
| *H04H 20/67* | (2008.01) |
| *G08G 1/09* | (2006.01) |
| *H04W 4/06* | (2009.01) |
| *H04H 20/02* | (2008.01) |
| *H04H 20/74* | (2008.01) |

(52) U.S. Cl.
CPC ................ *H04H 20/88* (2013.01); *G01S 19/13* (2013.01); *G08G 1/094* (2013.01); *H04H 20/02* (2013.01); *H04H 20/57* (2013.01); *H04H 20/62* (2013.01); *H04H 20/67* (2013.01); *H04H 20/74* (2013.01); *H04W 4/06* (2013.01)

(58) Field of Classification Search
CPC ....... H04H 20/02; H04H 20/67; H04H 20/74; H04W 4/06
USPC ............. 455/3.01–3.06, 12.1, 11.1, 427, 429, 455/445, 414.1–414.4, 403, 422.1, 455/456.1–457, 500, 517, 426.1, 426.2, 455/550.1, 561, 575.1, 93, 90.1–90.3; 370/310, 310.2, 316, 315, 324
See application file for complete search history.

(56) References Cited

FOREIGN PATENT DOCUMENTS

| | | | |
|---|---|---|---|
| CN | 101771486 A | * | 7/2010 |
| CN | 102622869 A |   | 8/2012 |

(Continued)

OTHER PUBLICATIONS

International Search Report for International Application No. PCT/BR2013/000092, mailed Oct. 11, 2013.

*Primary Examiner* — Keith Ferguson
(74) *Attorney, Agent, or Firm* — Pearl Cohen Zedek Latzer Baratz LLP

(57) ABSTRACT

The present invention relates to a system that integrates various transmission/reception technologies, e.g. satellite, frequency modulated (FM), etc. for specific highway use, allowing the use of one and the same frequency-modulated frequency along a road in a synchronized manner.

5 Claims, 1 Drawing Sheet

(56) References Cited

FOREIGN PATENT DOCUMENTS

| | | |
|---|---|---|
| EP | 0840270 A2 | 5/1998 |
| JP | H11237250 A | 8/1999 |
| JP | 2000099889 A | 4/2000 |
| JP | 2000346662 A | 12/2000 |
| JP | 2002222495 A | 8/2002 |
| KR | 20020093356 A | 12/2002 |
| KR | 20050005324 | 1/2005 |

* cited by examiner

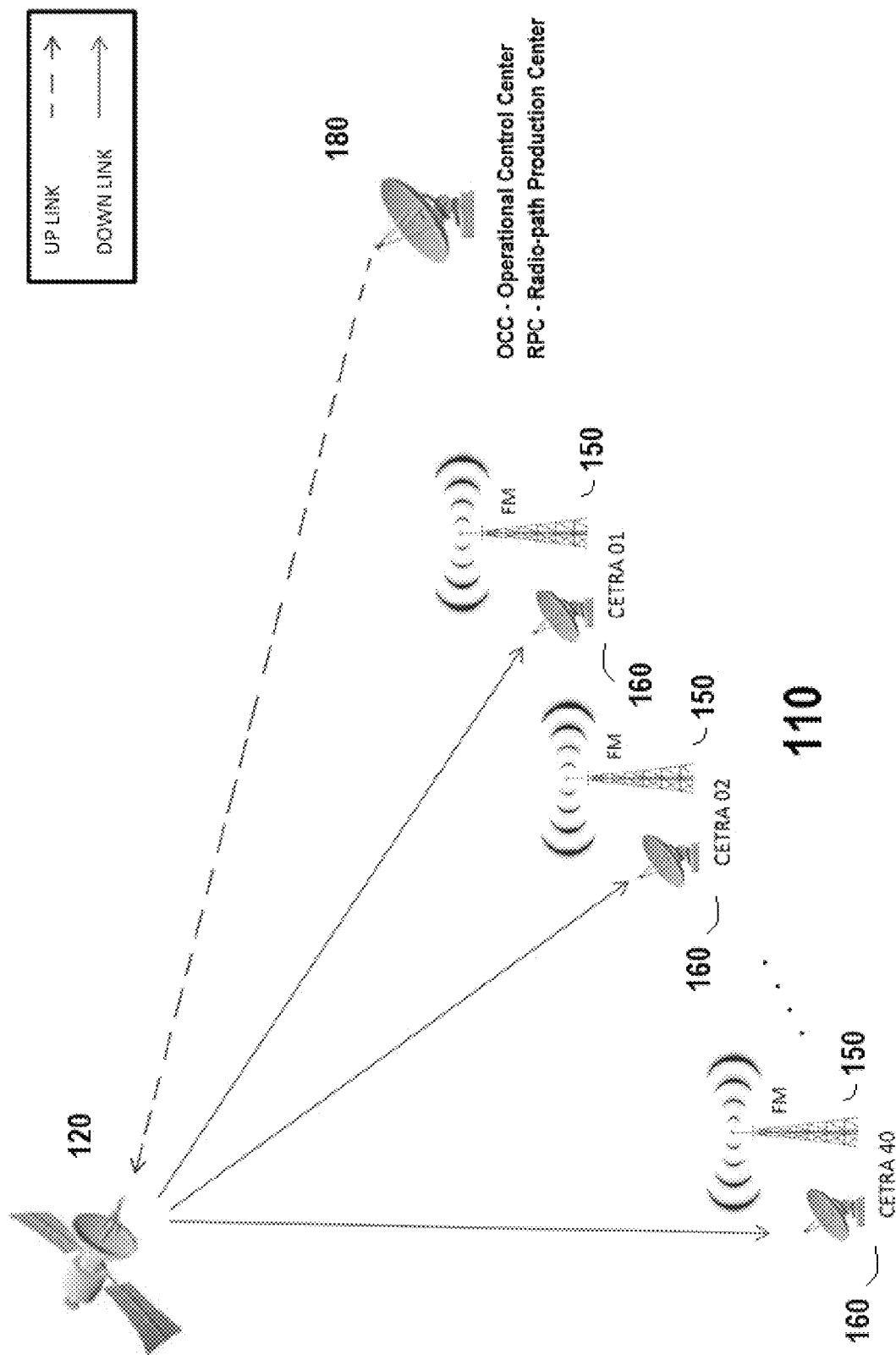

SYSTEM FOR THE INTEGRATION OF SIGNAL-TRANSMISSION/-RECEPTION TECHNOLOGIES FOR HIGHWAY USE

CROSS-REFERENCE TO RELATED APPLICATIONS

This application is a National Phase Application of PCT International Application No. PCT/BR2013/000092, International Filing Date Mar. 25, 2013, claiming priority of Brazilian Patent Application No. BR 10 2012 006742-0, filed Mar. 26, 2012, which is hereby incorporated by reference.

FIELD OF THE INVENTION

The present invention is a system for integration of technologies of transmission/reception of signals for use on highways.

BACKGROUND OF THE INVENTION

There are various transmission systems used in highways, mainly based on frequency modulation (FM), however the prior art fails to describe or disclose a system that integrates several technologies of transmission/reception, such as satellite, FM, etc., integrated among themselves for the specific application to highways, enabling the use of a same frequency along the road, in a synchronized way, as described in the present invention.

SUMMARY OF THE INVENTION

The present invention refers to a system for the integration of signals transmission/reception technologies for use on highways, wherein the technologies to be integrated correspond to technologies of band C or Ku transmission/reception satellite, FM, among others, for the specific application to highways, the system comprising a radio-path transmitting cell (CETRA) comprising a housing; a transmitter unit in frequency modulation (FM); a satellite digital receiver unit; a GPS unit; a telemetry unit; and proprietary computer program for synchronization, in that: uplink signals are transmitted to a satellite from an Operational Control Center (OCC) or Radio-path Production Center (RPC), while downlink signals from the satellite are received by CETRAs and transmitted on frequency modulation (FM); wherein a single frequency in frequency modulation (FM) is used along a road/highway, in a synchronized manner; and where the number of CETRAs depends on the size of the road/highway, height of tower and the transmission power of each CETRA.

BRIEF DESCRIPTION OF THE DRAWING

FIG. 1 is a topology of an embodiment of the present invention, wherein uplink signals are transmitted to the satellite from the Operational Control Center (OCC) or Radio-path Production Center (RPC), while downlink signals from the satellite are received by radio-path transmitting cells (CETRAs) and transmitted on frequency modulation (FM).

DETAILED DESCRIPTION OF THE INVENTION

The operation and functioning system of frequency modulation (FM) transmission in highways, is based on FM transmitter cells, installed physically separately among themselves, as described below, being applicable to any highway, enabling the use of a same frequency along the road, in a synchronized way. Therefore, the FM automotive or handheld receiver, on the highway, receives the signals as if it were a single and central transmission.

To do so an UNICLOCK system is required, here defined as any method that allows a set of transmitters in frequency modulation (FM), which uses the same frequency, all synchronized by GPS and specific software, and that from a single audio source, via satellite, or other means, enable continued reception and with no interference, and or discontinuities, along the highway. Therefore the UNICLOCK method is generic and encompassing all forms and procedures that allow a set of transmitters, physically separated, working in synchrony, on the same transmission frequency.

General Description of the System

Stereo audio signals in analog format L and R, corresponding to each highway to be covered will be transmitted directly from a Radio-path Production Center (RPC), through a digital uplink, band C or Ku satellite.

Along every highway, cells composed of satellite reception and transmission systems in frequency modulation (FM) send FM signals directed to the specific roadbed.

The set of cells whose transmissions will be overlapped and complementary will provide intense signal along the highway and of single channel in FM to be tuned.

Origin of the Contents in Audio Channels

In the Radio-path Production Center (RPC) several contents necessary for the custom shape of each highway are generated.

The digital uplink is provided with an encoder capable of digitalizing and compressing N stereo audio channels, corresponding to each content, and to each highway, wherein the digital uplink carry out the transmission to the satellite.

Receipt of Contents in Audio Channels

In the cells, along the highway, there is a satellite reception system—downlink, provided with C or Ku band, LNBF and IRD parabolic antenna, among others.

The downlink set has the function of receiving satellite signals and convert them into stereo L and R analog audio channel.

FM Transmission

Analogic L and R audio signals are modulated in FM, and using a stereo generator, are transmitted and amplified to the maximum power level of 100 W.

FM transmission system uses directive transmission antennas, for total concentration of FM signal in the highway bed. In an illustrative embodiment of the invention, which may be used for the highway "Nova Dutra", for example, may be used the single frequency of 107.5 MHz.

Set of Stations

For full coverage of the highways N FM stations are designed, that are distributed along the road, installed in self-supporting towers, with an average transmission height of 30 m.

Each set of equipment installed on the same tower is named radio-path transmitting cell (CETRA). For example, for the Nova Dutra highway can be used about 40 CETRAs.

Radio-Path Transmitting Cell (CETRA)

This is the system cell. It is also the cell of the invention. The CETRA unit is a single equipment, specially designed specifically to cover only in FM the highways encompassed by the system.

Is the result of the sum of knowledge and integration of several equipments adapted and integrated, to form a single set.

The System, comprising CETRAs, was invented to make feasible the creation of the radio-path Service, not yet regulated in Brazil, complying with the premises of the Brazilian Telecommunications Agency (ANATEL) through authorization to Experimental and Scientific Ends, adapting the Service to real conditions of the highways located in Brazil. However, the invention is not limited to use on Brazilian highways, but encompass the broader scope of any road/highway in the world.

Each CETRA is comprised of:
Housing;
FM transmitter unit (100 W);
Satellite digital receiver unit;
GPS Unit;
Telemetry unit; and
Proprietary software for synchronization.

It should be highlighted that for the CETRA network be operational it is necessary a set of adjustments and adaptations.

The invention claimed is:

1. A system for integration of technologies of transmission/reception of signals for use on highways, wherein the technologies to be integrated correspond to technologies of band C or Ku transmission/reception satellite, frequency modulation (FM), for the application also to highways, the system comprising:
a radio-path transmitting cells (110) comprising a housing; a transmitter unit in frequency modulation (FM) (150); a satellite digital receiver unit (160); a satellite reference unit; a telemetry unit; and proprietary computer program for synchronism,
wherein uplink signals are transmitted to a satellite from an Operational Control Center (OCC) or Radio-path Production Center (RPC) (180), while downlink signals from the satellite (120) are received by radio-path transmitting cells (110) and transmitted on frequency modulation (FM); and
wherein a single frequency in frequency modulation (FM) is used along a road/highway, in order to simultaneously use audio and radio frequency synchronism, referenced via satellite.

2. The system for integration of technologies of transmission/reception of signals for use on highways of claim 1, wherein a radio-path transmitting cell (110) is arranged every 10 Km.

3. The system for integration of technologies of transmission/reception of signals for use on highways of claim 1, wherein the single frequency in frequency modulation (FM) along a road/highway, in a synchronized way is 107.5 MHz.

4. The system for integration of technologies of transmission/reception of signals for use on highways of claim 1, wherein the average height of the transmission tower of the radio-path transmitting cell (110) is 30 m.

5. The system for integration of technologies of transmission/reception of signals for use on highways of claim 1, wherein the transmission power of each radio-path transmitting cell (110) is of up to 100 W.

* * * * *